Patented Oct. 25, 1927.

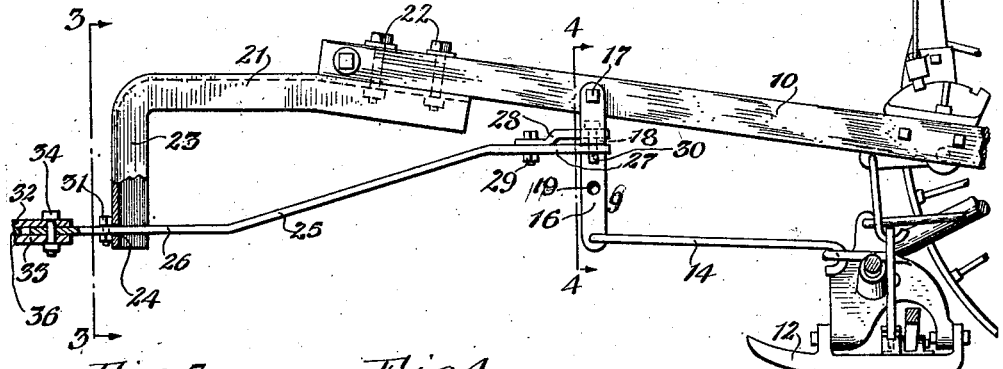

1,646,519

UNITED STATES PATENT OFFICE.

ERNEST BASEMAN, OF BATAVIA, NEW YORK, ASSIGNOR TO MASSEY-HARRIS HARVESTER COMPANY, INC., OF BATAVIA, NEW YORK, A CORPORATION OF NEW YORK.

HITCHING MECHANISM FOR CONNECTING MOWERS AND TRACTORS.

Application filed September 2, 1924. Serial No. 735,241.

This invention relates to a hitching mechanism for connecting a mowing machine with a tractor so that the mower can be hauled by power over the field which is to be mowed in practically the same manner and obtaining the same effect as though the mower were propelled by horse-power as has been the custom heretofore.

It is the object of this invention to provide a hitching mechanism for this purpose which can be readily applied to mowers of standard construction without requiring any material change in the same; which is reliable and efficient in its operation and which can be installed at a comparatively low cost.

In the accompanying drawings:

Figure 1, is a fragmentary sectional side elevation of the front part of a mower showing my improved hitching mechanism and the rear part of a tractor.

Figure 2, is a top plan view of the same, partly in section.

Figures 3 and 4 are vertical transverse sections taken on the correspondingly numbered lines in Figure 1.

Figure 5, is a fragmentary side elevation of the hitching mechanism showing the means for adjusting the mower transversely relative to the tractor for the purpose of causing the tractor to run in the stubble portion of the field while the mower runs in that portion of the field in which the grain or hay is standing is to be cut.

Figure 6, is a top plan view of the features of construction shown in Figure 5.

Figure 7 is a fragmentary vertical section showing a variation in the manner of coupling a mower with a tractor in accordance with my invention.

Figure 8 is a horizontal section taken on line 8—8, Figure 7.

Similar characters of reference indicate like parts in the several views of the drawings.

The standard parts of the mowing machine with which my improved hitching mechanism cooperates and which are shown in the drawings comprise a longitudinal pole 10 forming part of the main frame which is supported upon the ground by means of wheels of which only the grainward wheel 11 is shown in the drawings, a shoe 12 adapted to run over the ground in front of the grainward wheel 11 and carrying the cutter-bar 13, and a vertical equalizer 9 pivotally connected at its upper end with the central part of the pole and connected at its lower end by means of a draw rod 14, with the upper part of the shoe. This equalizer in its preferred construction comprises two bars 15 and 16, which are pivotally connected at their upper ends with opposite sides of the pole by means of a horizontal transverse bolt 17 while the lower ends of the same are connected with the front end of the draw rod 14. The equalizing bar 15 is straight while the equalizing bar 16 has its upper and lower rear ends offset from each other and connected by a horizontal web 18, as shown in Figure 4. Ordinarily the horse or other animal heretofore employed for pulling the mower has been hitched to the equalizer at a point between its upper and lower ends where the same was provided with an opening 19 for hitching the horse thereto. In the present case the same equalizer is employed for receiving the hitching mechanism whereby the mower is attached to the rear part of a tractor for propelling the mower by power. This tractor may be of any suitable construction and it has, therefore, been deemed unnecessary to show any more than the rear part or member 20 of the same with which the mower is to be coupled by my improved hitching mechanism which latter in its preferred embodiment shown in the drawings is constructed as follows:

Arranged on the front part of the main frame of the mower is a supporting bracket or yoke which, in its preferred form, consists of a horizontal longitudinal rear arm 21 which has its rear end connected with the underside of the front end of the pole 10 by means of bolts 22 and a vertical front arm 23 which depends from the front end of the rear arm, as shown in Figures 1 and 5. This bracket is preferably constructed of channel iron, as shown, and the pole 10 is cut short so as to produce in effect a stub pole as compared with a full length pole commonly used when the mower is horse drawn. On its lower part the lower arm of the supporting bracket is provided with a guide opening 24.

The numeral 25 represents a longitudinal draw bar which is preferably constructed of iron and has its front and rear ends offset vertically relatively to each other, the depressed front end 26 passing through the guide opening 24 of the supporting bracket and the elevated rear end 27 of the same being coupled with the web 18 of the equalizer. This coupling is effected by engaging the rear end 27 of the draw bar with the underside of the web 18 and providing a separate coupling plate 28 which is connected at its front end with the top of the draw bar by means of a bolt 29 while its rear end engages with the top of the web 18 and is connected with the same and the rear end 27 of the draw bar by means of a vertical coupling pin 30, as shown in Figures 1 and 4.

Upon pulling forwardly on the draw bar the frame or carriage of the mower is moved forwardly as well as the shoe and cutter-bar and other parts associated therewith which pull of the draw bar is transmitted to these parts with an equalizing effect through the medium of the equalizer referred to. The draw bar is also capable of moving backwardly relatively to the supporting bracket, pole, cutter bar and associated parts, but this backward movement of the draw bar is limited so that the power of the tractor may be utilized to back up the mower. For this purpose a stop is mounted on the draw bar for engagement with the front side of the lower arm of the supporting bracket which stop may be of various forms, but preferably consists of a bolt 31 secured to the front part of the draw bar and engaged with its head with the front side of the supporting bracket.

By means of this portion of the hitching mechanism a pulling effect is produced upon the carriage and cutter bar of the mower which is identical with the pulling effect heretofore produced by animal power, such as a horse hitched to the pole and to the equalizer in the manner heretofore commonly practiced, and the carriage and cutter bar are also guided over the field which is to be mowed. The mower is also capable of being backed up in the present case by the power tractor with substantially the same effect as has been done heretofore by animal power.

Means are provided for connecting the front end of the draw bar of the hitching mechanism with the rear end of the pulling member 20 on the rear part of the tractor so as to permit the mower to be adjusted transversely relatively to the tractor for causing the mower to run properly in the standing hay, wheat or other grain, while the tractor itself is running in the stubble or cut part of the field. For this purpose an adjusting coupling is provided, which in its preferred construction comprises upper and lower draw plates 32 and 33 of metal, the rear ends of which receive between them the front end 36 of the draw bar and are detachably connected therewith by means of a bolt 34 while the front ends of the same receive between them the pull member 20 of the tractor and are detachably connected therewith by means of a plurality of fastening bolts 35. Between the central part of the draw plates 32 and 33, is arranged a spacer 36 which maintains these plates in spaced relation and which is secured to these plates by means of fastening bolts 37, as shown in Figures 5 and 6. The draw plates are preferably cut at an angle so that they incline laterally from the tractor which is running on the stubbleward part of the field rearwardly toward the mower which is running on the grainward part of the field. The front ends of the draw plates are preferably rigidly secured to the pull member of the tractor by means of the bolts 35 and the rear ends of these plates are provided with openings 38 which are arranged in a transverse row so that the coupling bolt 34 may be shifted from one pair of corresponding openings 38 in the draw plates to another and thereby bring the line of draft of the tractor relative to the line of draft of the mower into different positions relatively to each other. By this means it is possible to adjust the connection between the tractor and the mower so as to produce the desired pull upon the latter and still enable the mower to run with its cutter bar over the uncut part of the field while the tractor is running wholly over the cut portion of the field.

If desired the oblique coupling means may be dispensed with and instead the front end 26 of the draw bar may be connected by a bolt 39 directly with the pulling member 201 at the rear end of a tractor, as shown in Figures 7 and 8.

The means whereby this lateral adjustment of the tractor and mower relatively to each other is effected are comparatively simple in construction, they are not liable to get out of order and it is possible to effect the adjustment of the tractor and mower relatively to each other with ease and facility.

I claim as my invention:—

The combination with a mower having a pole, a cutter bar, a shoe supporting the cutter bar and an upright equalizing bar pivoted at its upper end to said pole and connected at its lower end with said bar, of means for hitching said mower to a tractor comprising a bracket mounted on said pole, a draw bar guided on the bracket and connected at its rear end with said equalizing bar and adapted to be coupled at its front end with a tractor, and a stop arranged on said draw bar and adapted to engage said bracket for limiting the backward movement of said draw bar relative to the bracket but permitting said draw bar to move forwardly independently of said bracket.

ERNEST BASEMAN.